United States Patent
Yeh et al.

(10) Patent No.: US 6,329,978 B1
(45) Date of Patent: *Dec. 11, 2001

(54) CURSOR CONTROL DEVICE

(76) Inventors: Fu-Kuo Yeh; Mei-Yun Chen, both of 3F, No. 2, Lane 42, Hou-Kang St., Shih-Lin Dist., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 09/087,999

(22) Filed: Jun. 1, 1998

Related U.S. Application Data

(63) Continuation-in-part of application No. 08/908,098, filed on Aug. 11, 1997.

(51) Int. Cl.⁷ ................................................... G09G 5/08
(52) U.S. Cl. .......................................... 345/157; 345/163
(58) Field of Search ..................... 345/161, 157, 345/184, 160, 145, 163, 166, 165, 856–858

(56) References Cited

U.S. PATENT DOCUMENTS

| | | | |
|---|---|---|---|
| 4,935,728 | * 6/1990 | Kley ........................................ 340/709 |
| 5,195,179 | * 3/1993 | Tokunaga ............................... 395/161 |
| 5,293,158 | * 3/1994 | Soma ..................................... 345/161 |
| 5,488,392 | * 1/1996 | Harris .................................... 345/157 |
| 5,568,164 | * 10/1996 | Ogawa ................................... 345/145 |
| 5,760,764 | * 6/1998 | Martinelli .............................. 345/160 |
| 5,771,037 | * 6/1998 | Jackson ................................. 345/157 |
| 6,072,469 | * 6/2000 | Chen et al. ............................ 345/157 |

* cited by examiner

*Primary Examiner*—Chanh Nguyen
*Assistant Examiner*—Fritz Alphonse
(74) *Attorney, Agent, or Firm*—Bacon & Thomas

(57) ABSTRACT

A cursor control device, the input device thereof may be a mouse, a track ball, a hand writing plate, etc. Since at least two registers are installed on each axis of the input for counting the number of the signals 0 and 1, and presetting the rotary distance of each axis, and by a single operating mode, the movement of the input device may be detected, therefore, by the dedicated two axial mouse input device, the mouse may move in a very small range to generate an effect of an absolute coordinate positioning, and the controlled cursor may wholly correspond to any point on the display screen for accurate positioning.

30 Claims, 4 Drawing Sheets

CURSOR CONTROL DEVICE

This is a C-I-P of application Ser. No. 08/908,098 filed Aug. 11, 1997.

BACKGROUND OF THE INVENTION

1. Field of the Invention

The present invention relates to a cursor control device, which is a C.I.P. application of U.S. Pat. No. 08/908,098, filed on Aug. 11, 1997 and is a two axial input device, by a single operation mode, the movement of the input device is detected so as to reduce the operation range and generate an absolute coordinate so to position accurately, the input device may be a mouse, a track ball, a hand writing plate, etc. for generating the signals 0 and 1.

2. Description of the Prior Art

In the conventional mouse, an active ball resists against two circular optic grid pieces to rotate, and then the signals, 0 and 1 are generated through the reading of a reading device. In the design of the mouse, the default reading value is installed with an acceleration ratio. Thus, by the increasing of the moving speed, the respective cursor on the display screen is also moved to a desired position rapidly. But in a virtual multiplying display screen, the input device must move many times to attain the boundary (as shown in FIG. 1). When the cursor is moved rapidly and then is reversed, the mouse will not return to the original point. If returning to a low speed operation, the mouse must move for a long distance and the positioning performance is not accurate. In summary, during the operation of the prior mouse, the hand needs to change position and lift frequently, and thus a larger moving area is required, therefore, the input operation is not convenient.

SUMMARY OF THE INVENTION

The main object of the present invention is to provide a novel cursor control device, in which a dedicated two axial mouse moves within a very small range so to generate a positioning effect of absolute coordinate, and the controlled mouse may be used to position any point on the display screen completely.

A further object of the present invention is to provide a cursor control device, by a two axial input device to read the signals 0 and 1 from a respective movement. The respective axis is only installed with two registers so that it may be used in a general used input device, such as a mouse, a track ball, a hand writing plate, etc. Thus, the operation range is saved and the positioning operation may be performed easily. The effect thereof is much superior to any prior input device.

Another object of the present invention is to provide a cursor control device so that the cursor is controlled to move on the display screen in an absolute coordinate type and may be compatible with a general used computer by a signal of relative coordinate.

In the following, using a general used mouse for input device as an example to describe the present invention.

In using the general mouse, at least two registers are installed on each axis of the input for counting the number of the signals 0 and 1, and presetting the rotary distance of each axis, and by a single operating mode, the movement of the mouse (input device) may be detected, therefore, so that the moving distance of the cursor on the display screen may be decided by choosing two different ratio constants according to the variation of moving speed and that the moving distance of the cursor on the display screen is positively proportional to the rotary distance of the input device, thus, the mouse may move in a very small range to generate an effect of an absolute coordinate positioning, and the controlled cursor may wholly correspond to any point on the display screen for accurate positioning and returning to the original point rapidly.

The present invention will be better understood and its numerous objects and advantages will become apparent to those skilled in the art by referencing to the following drawings in which:

DETAILED DESCRIPTION OF THE PREFERRED EMBODIMENT

Figure 1:
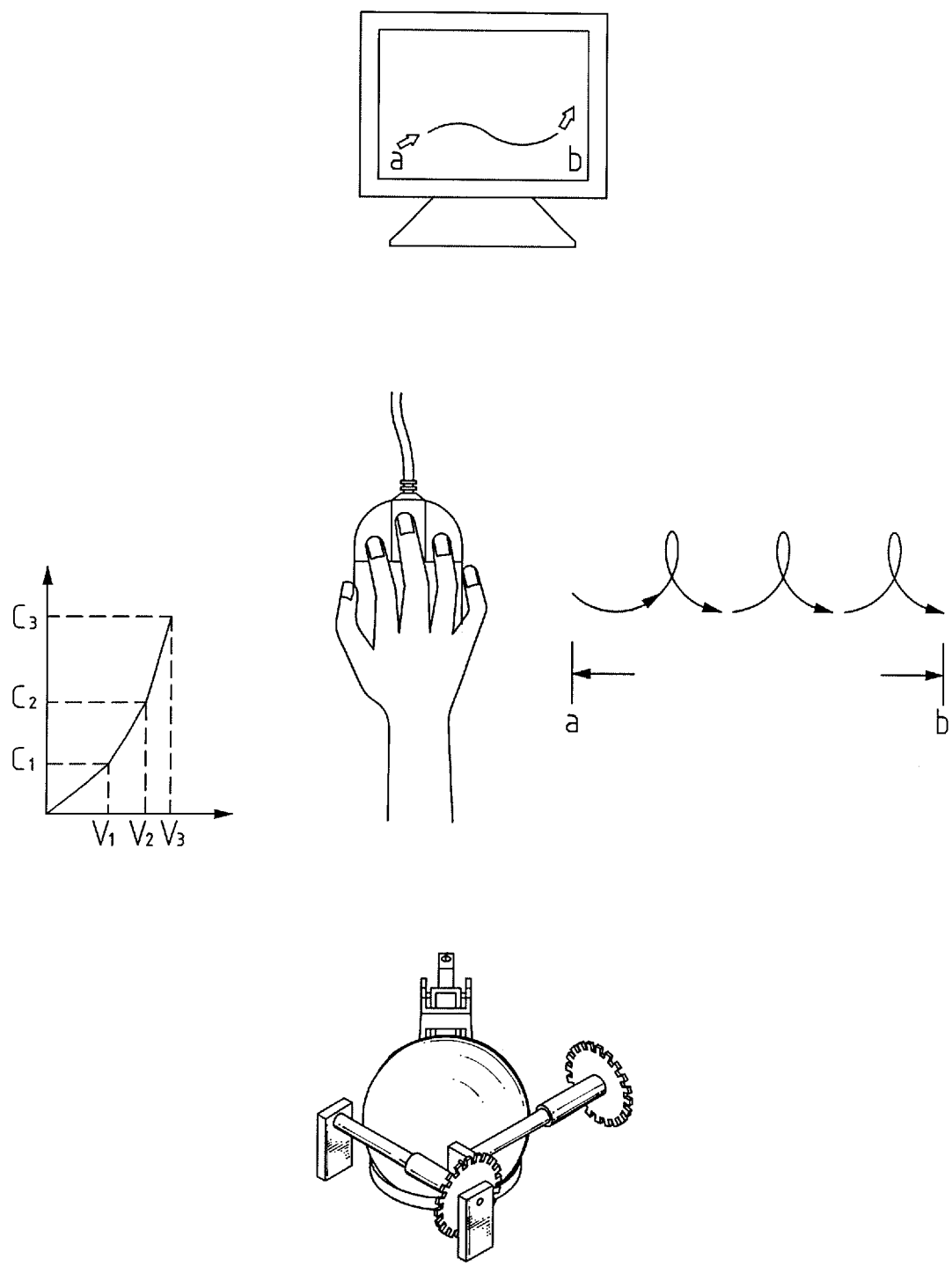
FIG. 1 is a schematic view shown that the operation of a cursor of the prior mouse on the display screen which moves from a point a to an adjacent point b.
Figure 2:
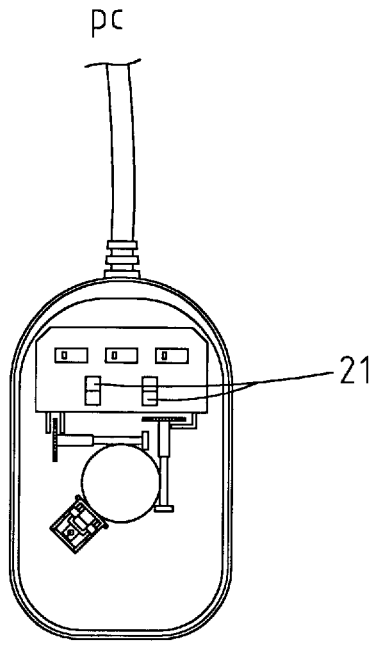
FIG. 2 is a schematic view shown that a prior mouse is used as an input device.

As shown in FIG. 2, in the present invention, as the prior mouse is used as an input device, two registers 21 are additionally installed on each axis of the input of prior general used mouse, and the rotary distance of each axis is preset.

Figure 3:
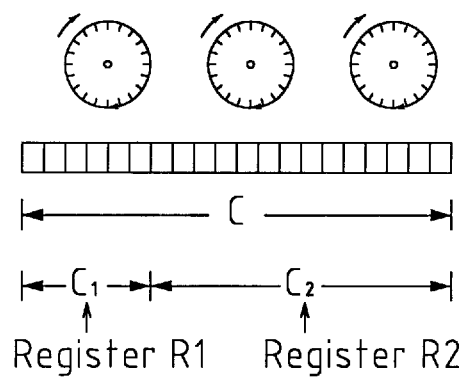
FIG. 3 is a schematic view shown that in one embodiment of the present invention, the registers R1 and R2 are correspondent to a low speed section C1 and a high speed section C2.

Referring to FIG. 3, the register of the present invention on each axis is presented by R1 and R2. The total number of the signals 0 and 1 generated by the rotary circles of the optic grid pieces of the mouse is set as a constant C, and the constant C is further divided into a low speed section C1 and a high speed section C2. Further assuming that each of the low speed section C1 and the high speed section C2 corresponds to different multiplier K1 and K2. The resolution of the display screen is the sum of each of the low speed section or high speed section multiplied by corresponding multiplier, i.e. C1K1+C2K2. The aforementioned registers R1 and R2 registers the lattices passed by the low speed section C1 and high speed section C2. Then the operating mode (referring to the aforementioned patent application) is used, as the mouse moves rapidly (referring to aforementioned patent application, FIG. 16D, VX is not smaller or equal to V2), so that the register R2 corresponding to the high speed section C2 is at least added by 2, while another register R1 corresponding to the high speed section C1 is at least subtracted by 1 so that the total movement is still retained in a value of 1. When the register R1 of C1 has reduced to C1/2, the operating mode of register R2 plus 1 of C2 is restored. Therefore, when the cursor has accessed to an object (When the manual control input device is in low speed), the cursor still can be positioned accurately.

Figure 4:
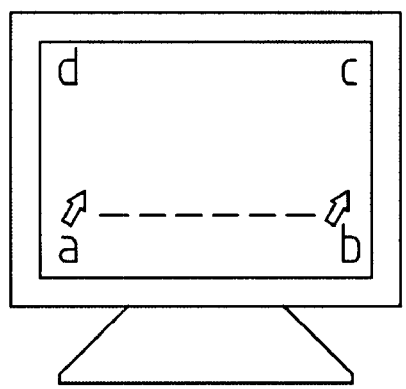
FIG. 4 is a schematic view shown that the input device of the present invention is correspondent to the whole display screen by controlling the cursor within a small range.
Figure 4:
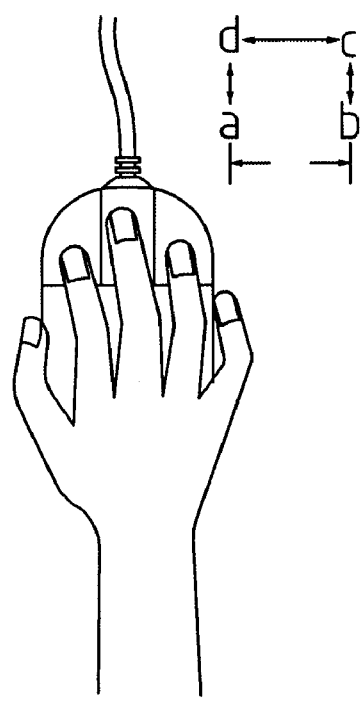

Thus as shown in FIG. 4, in each axis, the optic grid piece is only needed to rotate a few circles through the mouse to run a distance, then the resolution of the whole display screen is mapped. Within a small running range, the cursor is controlled to move and position on the whole screen so that the moving distance of the cursor on the display screen may be decided by choosing two different ratio constants according to the variation of moving speed, and that the moving distance of the cursor on the display screen is positively proportional to the rotary distance of the input device, thus the respective working area is reduced effectively. Thus by a short distance movement, the operation of absolute coordinate may be performed. Thus the troublesome condition that the position of the prior mouse must be changed frequently is completely avoided, and the moving distance of he mouse is greatly reduced. Therefore, the lifetime of a mouse is prolonged.

According to above operation, since the absolute coordinate data generated by the operating mode of the present invention is different from that in the traditional computer controlled mouse which is processed by relative coordinate. Thus the using of the mouse of the present invention must match with a driving program of the operating mode of the present invention. However, in order to be compatible with the traditional used computer, in the operating mode of the present invention, the absolute coordinates of the initial point and ending point on the display screen are subtracted to derive a respective effective distance of the two axes as an input signal, for example, the absolute coordinate of the initial point A is (50, 100), and the absolute coordinate of the ending point A is (100, 300), the two values are subtracted to derive an effective distance (50, 200). This value is used as an input signal of a relative coordinate, then the present invention will be compatible with the general computers for traditional input mouse devices, and new special driving program is not required.

Figure 5:
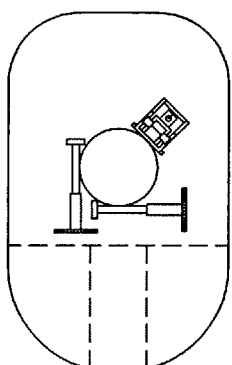
FIG. 5 is a schematic view shown that the register of the present invention is installed within a driving program.
Figure 6:
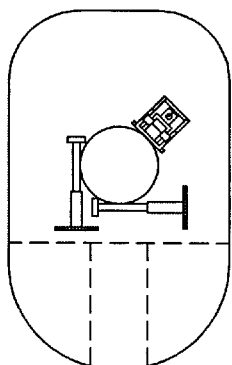
FIG. 6 is a schematic view shown that the register of the present invention is installed within a computer system program.

In the FIG. 2, the register and the positioning operation are installed on the control circuit of the mouse. While in fact, as shown in FIGS. 5 and 6, the registers may be installed outside the mouse, thus in the driving program or the computer system, the mouse only purely generates signals of 0 and 1, then these values are transferred to the additional program for calculating and positioning so that the unchanged mouse in the general circuit may be used.

Figure 7:
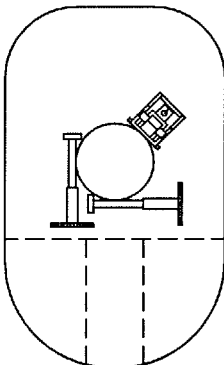
FIG. 7 is a schematic view shown an embodiment in which the present invention is installed with an identifying signal.

As shown in FIG. 7, an identification code signal is used to identify the mouse and the driving program for actuating the performing of the present invention, while before identifying, the system is used by a general mouse. Therefore, the present invention is a multifunctional device.

Although certain preferred embodiment of the present invention has been shown and described in detail, it should be understood that various changes and modification may be made therein without departing from the scope of the appended claims. For example, the input device may be other input devices of another types instead of mouse, such as an optic mouse, a track ball, a hand writing plate, etc. which can generate the signals of 0 and 1 within a predetermined range may be used to position and achieve an well effect.

What is claimed is:

1. A cursor controlling method comprising the steps of:
   (a) Providing an input device for detecting movement of a finger and generating digital data;
   (b) Setting:
      ratio constants K1, K2, . . . , Kn;
      respective maximum values C1, C2, . . . , Cn for each of a plurality of registers; and
      respective initial values for each of said registers, each of said registers corresponding to a different speed section V1, V2, . . . , Vn and one of a plurality of coordinate axes X1, X2, . . . , Xn, wherein n>=2;
   (c) Receiving digital data sent from the input device;
   (d) Determining the speed of the data and which speed section the data corresponds to for each coordinate axis;
   (e) Adding a respective data value of said received digital data to the register corresponding to the speed section determined in step (d) until a resultant data value V1X1, V2X2, . . . , VnXn is at least equal to the maximum value for the respective register, and then adding a remainder value to the other registers in any order to obtain result data values for the other registers; and
   (f) Controlling the cursor based on the sum of the multiples of the respective ratio constants and resultant data values in said registers as a display value, said sum equaling K1*V1X1+K2*V2X2+ . . . +Kn*VnXn.

2. A cursor controlling method as claimed in claim 1, further comprising the step of causing a data value in one of said registers to approach C1/2 when the speed of receiving data is within a register corresponding to a higher speed section for each axis.

3. A cursor controlling method as claimed in claim 2, wherein the step of causing a data value in one of said registers to approach C1/2 is carried out by adding N to the data value in said one of said registers while subtracting N from a register corresponding to a higher speed section, wherein N is an integer.

4. A cursor controlling method as claimed in claim 1 or 3, wherein the steps of the method are performed by a circuit of the input device.

5. A cursor controlling method as claimed in claim 1 or 3, wherein the input device only generates and transfers digital data, while the steps of the method are performed in a driving program or a system program outside the input device.

6. A cursor controlling method as claimed in claim 1 or 3, wherein the input device is selected from the group consisting of a mouse, a track ball, a hand writing plate, and a touch pad.

7. A cursor controlling method as claimed in claim 1 or 3, wherein the input device is arranged to generate and send digital data after detecting the movement of the finger.

8. A cursor controlling method as claimed in claim 4, wherein the absolute coordinate values of the initial point on the display is subtracted from that of the ending point for deriving the effective relative display value, so that the input device is compatible with computers designed to use traditional cursor controlling devices.

9. A cursor controlling method as claimed in claim 4 or 5, wherein an identification code signal is used to identify the input device and the driving program for actuating the position operation.

10. A cursor controlling method as claimed in claim 4, wherein the input device is a mouse having at least two registers corresponding to each optical grid piece of the mouse.

11. A cursor controlling method as claimed in claim 5, wherein the cursor controlling device is a mouse having at least two registers corresponding to each optical grid piece of the mouse.

12. A cursor controlling method as claimed in claim 9, wherein the input device is a mouse having at least two registers corresponding to each optical grid piece of the mouse.

13. A cursor controlling method as claimed in claim 1, further comprising the step of setting at least one acceleration ratio for adjusting the input device to match the positive proportional positioning relation.

14. A cursor controlling method as claimed in claim 5 wherein the driving program has at least one acceleration ratio for adjusting the mouse to match the positive proportional positioning relation.

15. A cursor controlling device, comprising:
an input device for detecting relative movement of a finger within a predetermined range divided by at least two coordinate axes and for generating digital data;
at least two registers for each coordinate axis, each of said registers corresponding to a different speed section for a respective coordinate axis; and
a single operating mode switching means for detecting the movement of the input device and switching between at least two ratio constants according to variation in moving speed of the input device to control a moving distance of the cursor on the display, which is positively proportional to a relative moving distance of the input device, wherein the single operating mode switching means includes:
  means for providing an input device for detecting movement of a finger and generating digital data;
  means for setting:
    ratio constants K1, K2, . . . , Kn;
    respective maximum values C1, C2, . . . , Cn for each of said registers; and
    respective initial values for each of said registers, wherein n>=2;
  means for determining the speed of the data and which speed section the data corresponds to for each coordinate axis; and
  means for adding a respective data value of said received digital data to the register corresponding to the speed section determined by said speed determining means until a resultant data value V1X1, V2X2, . . . , VnXn is at least equal to the maximum value for the respective register, and then adding a remainder value to the other registers in any order to obtain result data values for the other registers; and
  means for controlling the cursor based on the sum of the multiples of the respective ratio constants and resultant data values in said registers as a display value, said sum equaling K1*V1X1+ K2*V2X2+ . . . +Kn*VnXn.

16. A cursor controlling device as claimed in claim 15, wherein the single operating mode includes means for causing a data value in one of said registers to approach C1/2 when the speed of receiving data is within a register corresponding to a higher speed section for each axis.

17. A cursor controlling device as claimed in claim 15, wherein the means for causing a data value in one of said registers to approach C1/2 includes means for adding N to the data value in said one of said responding] registers while subtracting N from a register corresponding to a higher speed section, wherein N is an integer.

18. A cursor controlling device as claimed in claim 15, 16 or 17, wherein the operating mode means is included in a circuit of the input device.

19. A cursor controlling device as claimed in claim 15, 16 or 17, wherein the input device only generates and transfers digital data, while the registers and the operating mode means are included in a driving program or a system program outside the input device.

20. A cursor controlling device as claimed in claim 15, 16, or 17, wherein the input device is selected from the group consisting of a mouse, a track ball, a hand writing plate, and a touch pad.

21. A cursor controlling device as claimed in claim 15, 16 or 17, wherein the input device generates and sends digital data after detecting movement of the finger.

22. A cursor controlling device as claimed in claim 15, 16 or 17, wherein the input device is a mouse selected from the group consisting of an electrical mechanical mouse, optical mouse, and absolute coordinate mouse.

23. A cursor controlling device as claimed in claim 18, wherein the absolute coordinate values of the initial point on the display is subtracted from that of the ending point for deriving the effective relative display value, so that the input device is compatible with computers designed to use traditional cursor controlling devices.

24. A cursor controlling device as claimed in claim 18 or 19, wherein an identification code signal is used to identify the input device for actuating the positioning operation.

25. A cursor controlling device as claimed in claim 18, wherein the input device is a mouse having at least two registers corresponding to each optical grid piece of the mouse.

26. A cursor controlling device as claimed in claim 19, wherein the input device is a mouse having at least two registers corresponding to each optical gild piece of the mouse.

27. A cursor controlling device as claimed in claim 24, wherein the input device is a mouse having at least two registers corresponding to optical grid piece of the mouse.

28. A cursor controlling device as claimed in claim 15, wherein the movement of the cursor on the display is according to a number increment of a signal of the input device.

29. A cursor controlling device as claimed in claim 15, wherein the signal operating mode means further includes means for setting at least one acceleration ratio for adjusting the input device to match the positive proportional positioning relation.

30. A cursor controlling device as claimed in claim 19, wherein the driving program has at least one acceleration ratio for adjusting the mouse to match the positive proportional positioning relation.

* * * * *